R. M. NEWBOLD.
LAMP BRACKET.
APPLICATION FILED JAN. 24, 1910.
979,878.
Patented Dec. 27, 1910.
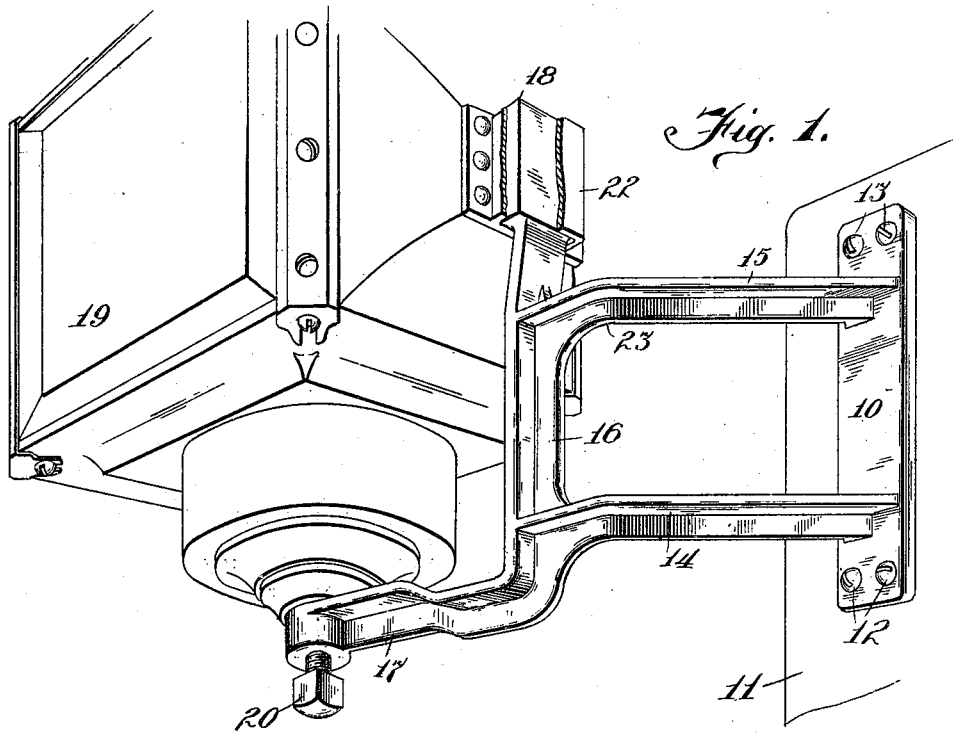
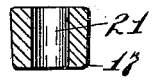
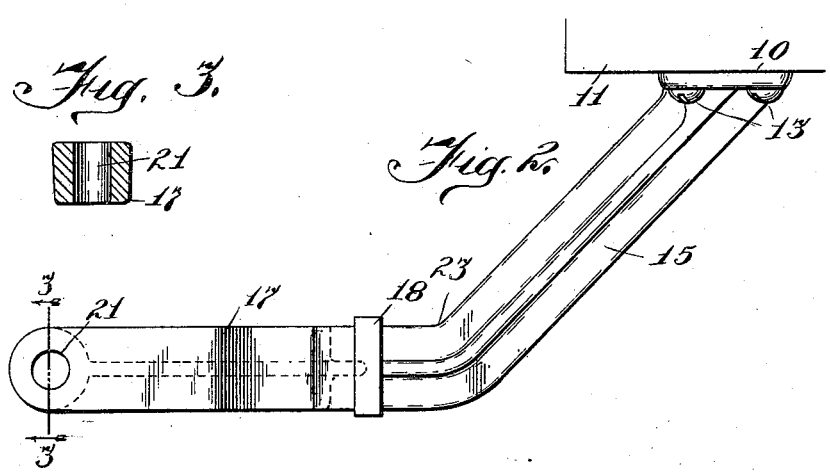
Witnesses
Milton Lenoir
E. M. Hatcher
Inventor,
Roger M. Newbold
By Gilson Gilson
Attorneys.

UNITED STATES PATENT OFFICE.

ROGER M. NEWBOLD, OF CHICAGO, ILLINOIS, ASSIGNOR TO THE ADAMS & WESTLAKE COMPANY, A CORPORATION OF ILLINOIS.

LAMP-BRACKET.

979,878.  Specification of Letters Patent.  Patented Dec. 27, 1910.

Application filed January 24, 1910. Serial No. 539,887.

*To all whom it may concern:*

Be it known that I, ROGER M. NEWBOLD, a citizen of the United States, and resident of Chicago, county of Cook, and State of Illinois, have invented certain new and useful Improvements in Lamp-Brackets, of which the following is a specification, and which are illustrated in the accompanying drawings, forming a part thereof.

The invention relates to brackets for supporting the side lamps of vehicles, such as automobiles; its object being to provide a more firm and secure support than has heretofore been used, and one which will relieve the lamp in great measure from the strains incident to jarring.

The invention consists in a structure such as is hereinafter described, and which is illustrated in the accompanying drawings, in which—

Figure 1 is a perspective of the bracket as applied to the dash-board of a vehicle, and carrying the lamp; Fig. 2 is a plan view of the bracket attached to a vehicle; and Fig. 3 is a section on the line 3—3 of Fig. 2.

The bracket comprises a wall plate 10, which may be secured to a dash-board 11 of an automobile, or other similar support, by means of screws, as shown at 12, 13; outstanding arms, preferably two in number, as shown at 14, 15, which may be cast integral with the wall plate; a bar 16 uniting the outer ends of the arms 14, 15; a sole plate 17 projecting outwardly from the lower end of the bar 16; and an upstanding lug 18, being, as shown, the end of the bar 16. A lamp, as 19, may rest upon the sole-plate 17 and be secured thereto by any suitable means, such as a screw-bolt 20 passing through a socket 21 at the outer end of the sole-plate and engaging the bottom of the lamp. The stud 18 is adapted to receive a socket lug 22 formed on the side of the lamp body. The weight of the lamp is principally borne by the sole-plate 17, and the lamp is laterally stayed by the lug 18. The arms 14, 15, project obliquely from the wall-plate 10 and are bent near their outer ends, as shown at 23, so that the sole-plate may project parallel with the face of the dash-board 11.

The entire bracket may be of a single piece, and the arms 14, 15, together with the wall plate 10 and connecting bar 16, form a rigid frame which will not readily yield under jarring strains, and hence the vibration of the lamp is reduced to a minimum.

By providing a positive seat upon which the bottom of the lamp may rest, its body is relieved almost entirely of the duty of sustaining its weight, and it therefore becomes feasible to construct the lamp of lighter material than is necessary when the support is by means of a side socket lug.

I claim as my invention—

1. In a lamp bracket for vehicles, in combination, a wall plate, a plurality of arms projecting therefrom and united at their outer ends, a sole-plate carried by the arms and forming a seat for the bottom of the lamp, and a lug carried by the arms for laterally staying a lamp mounted upon such seat.

2. In a lamp bracket for vehicles, in combination, a wall plate, a pair of arms projecting outwardly therefrom, a bar uniting the outer ends of the arms, a sole-plate forming a seat for the bottom of a lamp and projecting from the lower end of the bar, and an upstanding stud for engaging a lateral socket lug of the lamp.

3. A lamp bracket comprising, in combination, a wall plate, an arm projecting from the plate and having branches at its outer end, one branch forming a central support for the bottom of the lamp and the other branch projecting upwardly for engaging the side of the lamp body adjacent its upper end.

4. A lamp bracket comprising, in combination, a wall plate, a support for centrally engaging the bottom of the lamp, a lateral support for engaging near its upper end a lamp seated upon the first-named support, such two supports being carried by the wall plate.

ROGER M. NEWBOLD.

Witnesses:
WM. L. HAMM,
E. M. KLATCHER.